(12) United States Patent
Yoshida

(10) Patent No.: US 6,815,111 B1
(45) Date of Patent: Nov. 9, 2004

(54) SEPARATOR FOR A FUEL CELL AND A METHOD OF PRODUCING THE SAME

(75) Inventor: Tsunemori Yoshida, Sanda (JP)

(73) Assignee: Nippon Pillar Packing Co., Ltd., Osaka (JP)

(*) Notice: Subject to any disclaimer, the term of this patent is extended or adjusted under 35 U.S.C. 154(b) by 0 days.

(21) Appl. No.: 09/660,394

(22) Filed: Sep. 12, 2000

(51) Int. Cl.$^7$ ............................................. H01M 2/00
(52) U.S. Cl. ........................... 429/34; 429/41; 429/253
(58) Field of Search ............................. 429/34, 41, 253

(56) References Cited

U.S. PATENT DOCUMENTS

| | | | |
|---|---|---|---|
| 4,737,421 A | * | 4/1988 | Uemura et al. ............. 429/251 |
| 6,180,275 B1 | * | 1/2001 | Braun et al. ................ 429/30 |
| 6,242,124 B1 | * | 6/2001 | Saito et al. ................ 29/623.1 |

* cited by examiner

Primary Examiner—Laura Weiner
(74) Attorney, Agent, or Firm—Bacon & Thomas, PLLC

(57) ABSTRACT

In a separator for a fuel cell and a method of producing a separator for a fuel cell according to the invention, bond-carbon is used in which composition ratios are set to 85 to 97 wt. % (preferably, 91 to 96 wt. %) of graphite powder having an average diameter in a range of 15 to 125 μm (preferably, 40 to 100 μm), and 3 to 15 wt. % (preferably, 4 to 9 wt. %) of a thermosetting resin. The compound is previously cold-molded into a shape similar to a final molded shape. The preliminary molded member is then placed in a mold, and a molding pressure in a range of 10 to 100 MPa (preferably, 20 to 50 MPa) is applied, thereby molding the member into a separator of the final shape. Therefore, a separator which is uniform and has a predetermined shape can be surely obtained while reducing the volume resistivity so as to ensure a good conductivity, whereby the performance of a fuel cell can be improved.

10 Claims, 5 Drawing Sheets

SEPARATOR FOR A FUEL CELL AND A METHOD OF PRODUCING THE SAME

BACKGROUND OF THE INVENTION

1. Field of the Invention

The present invention relates to a separator for a fuel cell which is mainly used as a cell for an electric vechicle, and also to a method of producing the separator, and more particularly to a separator for a fuel cell of the solid polymer electrolyte type or the phosphoric acid type, and also to a method of producing the separator. In a fuel cell of such a type, a unit cell which is a unit constituting the cell is configured by: sandwiching a gas diffusion electrode having a sandwich structure wherein an electrolyte membrane configured by an ion exchange membrane, between an anode and a cathode; sandwiching the gas diffusion electrode between separators; and forming fuel gas passages and oxidant gas passages between the separators, and the anode and the cathode.

2. Description of the Prior Art

In a fuel cell, a fuel gas containing hydrogen is supplied to an anode, and an oxidant gas containing oxygen is supplied to a cathode, so that, in the anode and the cathode, electrochemical reactions indicated by the formulae:

$$H_2 \rightarrow 2H^+ + 2e^- \quad (1)$$

$$(\tfrac{1}{2})O_2 + 2H^+ + 2e^- \rightarrow H_2O \quad (2)$$

occur, and, in the whole of the cell, an electrochemical reaction indicated by the formula:

$$H_2 + (\tfrac{1}{2})O_2 \rightarrow H_2O \quad (3)$$

proceeds. The chemical energy of the fuel is directly converted into electrical energy, with the result that the cell can exert a predetermined performance.

A separator for a fuel cell of the solid polymer electrolyte type or the phosphoric acid type that is a kind of fuel cell in which such energy conversion is conducted is desirably gas-impermeable, and also is made of an electrically conductive material. As a material meeting the requirements, conventionally, an electrically conductive resin is used. An electrically conductive resin is a complex which is configured by bonding graphite (carbon) powder by means of a thermosetting resin such as phenol resin, or a so-called bondcarbon (resin-bonded carbon) compound. A separator for a fuel cell is configured by forming such a bondcarbon compound into a predetermined shape.

Conventionally, a separator for a fuel cell having a predetermined shape is formed by using such a bondcarbon compound in the following manner. With respect to the composition ratio of a thermosetting resin such as phenol resin and graphite powder, 25 to 40 wt. % of the thermosetting resin is used as an adequate content in consideration of moldability and workability of the bondcarbon compound.

In a conventional separator for a fuel cell which is configured by using a bondcarbon compound of such composition ratios, the content of a thermosetting resin serving as an electrically insulating material is large, and hence the conductivity of the separator itself is lowered so that the electrical resistance is increased. This is not preferable from the viewpoint of the performance of a fuel cell.

In order to improve the conductivity of a separator for a fuel cell which is configured by using a bondcarbon compound, it is contemplated that the content of a thermosetting resin be reduced as far as possible, and graphite powder of excellent crystallinity and having less impurities such as ash is selectively used. When the content of a thermosetting resin is reduced, however, elongation and fluidity of the bondcarbon compound during a molding process are lowered, and moldability is impaired. In order to improve the conductivity of a separator, furthermore, it is required to use graphite powder of excellent crystallinity. However, graphite powder of excellent crystallinity is usually poor in wettability and bondability to a resin. When graphite powder of excellent crystallinity is used, therefore, a larger resin content is required. As a result, a uniform separator is obtained more hardly as the resin content is smaller.

This will be described in more detail. With respect to a volume resistivity serving as an index of the conductivity of a separator which largely affects the performance of a fuel cell, it is requested to develop a separator having a volume resistivity of $1 \times 10^{-2}$ $\Omega \cdot cm$ or lower. In order to obtain a separator of a volume resistivity of such a degree, the resin content in the composition ratio with respect to graphite must be reduced to 15 wt. % or less. When the resin content is reduced to 15 wt. % or less, however, elongation and fluidity of the bondcarbon compound are lowered, and, when the resin content is smaller than 3 wt. %, the bondcarbon compound has substantially no fluidity. In the case where a bondcarbon compound of a resin content of 15 wt. % or less is used, even when the compound is charged into a heated mold, therefore, the compound hardly extends to every corners of the mold because the lack of the resin content causes the molten compound to exert insufficient fluidity. As a result, even when a molding pressure higher than a usual pressure or 5 to 10 MPa is applied, uneven molding easily occurs depending on the charging state of the compound, and a molded member (separator) which is normal in shape cannot be sometimes obtained.

SUMMARY OF THE INVENTION

The present invention has been conducted in view of the above-mentioned circumstances. It is an object of the invention to provide a separator for a fuel cell which can be formed into a uniform and predetermined shape while good conductivity is ensured by reducing the resin content so as to suppress the volume resistivity to $1 \times 10^{-2}$ $\Omega \cdot cm$ or lower.

It is another object of the invention to provide a method of producing a separator for a fuel cell wherein, even when a molding material in which the resin content is small, and which is therefore low in elongation and fluidity is used, the molding material can extend to every corner of a mold so that the separator having a uniform and correct shape that is free from molding unevenness, and good conductivity can be surely produced.

In order to attain the objects, the separator for a fuel cell of the invention is a separator for a fuel cell consisting of a complex which is configured by bonding graphite powder by means of a thermosetting resin, and characterized in that, in the complex, a composition ratio of the graphite powder is set to 85 to 97 wt. %, a composition ratio of the thermosetting resin is set to 3 to 15 wt. %, an average particle diameter of the graphite powder is set to a range of 15 to 125 $\mu m$, and the complex is molded at a pressure of 10 to 100 MPa.

Preferably, the composition ratio of the thermosetting resin in the complex is set to a range of 4 to 9 wt. %, and the average particle diameter of the graphite powder is set to a range of 40 to 100 $\mu m$. Preferably, the molding pressure of the complex is set to a range of 20 to 50 MPa.

In order to meet the above-mentioned demands for development, intensive studies on a separator for a fuel cell which is configured by using a bondcarbon compound, and finally found that the volume resistivity serving as an element which largely affects the performance of a fuel cell is determined not only by the composition ratios of a resin and graphite powder, but also by the average diameter of the graphite powder, and the molding pressure, and that the size of the average diameter of the graphite powder is closely related not only to the volume resistivity, but also to the fluidity, moldability, and strength of the compound. Based on this finding, the composition ratios of a resin and graphite powder, the average diameter of the graphite powder, and the molding pressure have been respectively set to the above-mentioned ranges, thereby completing the invention.

According to the thus configured invention, as the graphite powder which is the one composition of the complex and which largely affects the volume resistivity, graphite powder in which the average diameter is set to a range of 15 to 125 $\mu$m, preferably, 40 to 100 $\mu$m is used, the thermosetting resin which is the other composition of the complex, and which largely affects fluidity, modability, and strength is reduced to 3 to 15 wt. %, and a high molding pressure of 10 to 100 MPa is applied to the complex to increase the mold density, whereby the volume resistivity of the complex, and therefore that of the separator are lowered, so that elongation and fluidity of the complex serving as a molding material can be enhanced while improving the conductivity of the complex. As a result, the invention attains an effect that, even when graphite powder of excellent crystallinity is used, the compound can surely extend to every corner of a mold so that a uniform separator of a desired shape can be surely obtained, and the performance of a fuel cell can be remarkably improved.

The method of producing a separator for a fuel cell according to the invention is a method of producing a separator for a solid polymer electrolyte type fuel cell configured by molding a complex in which composition ratios are set to 85 to 97 wt. % of graphite powder, and 3 to 15 wt. % of a thermosetting resin, and an average diameter of the graphite powder is set to a range of 15 to 125 $\mu$m, and characterized in that the complex is previously cold-molded into a shape similar to a final molded shape, the preliminary molded member is then placed in a mold, and the preliminary molded member is molded into the final shape by applying a pressure of 10 to 100 MPa.

Preferably, the composition ratio of the thermosetting resin in the complex is set to a range of 4 to 9 wt. %, and the average particle diameter of the graphite powder is set to a range of 40 to 100 $\mu$m. Preferably, the molding pressure of the complex is set to a range of 20 to 50 MPa.

The shape similar to a final molded shape means that the dimensions other than those in the direction of the molding pressure are similar to corresponding ones of the final molded member. Preferably, dimensions of the preliminary molded member in the direction of the molding pressure are set to be about 1.0 to about 2.0 times dimensions of the final molded member. When such a preliminary molded member is used, the mold density and the volume resistivity can be further improved.

According to the production method of the invention having the above-described molding means, the two-step molding is employed wherein a complex (bondcarbon compound) in which elongation and fluidity are lowered and moldability is impaired by reduction of the resin content which is performed in order to lower the volume resistivity and enhance the conductivity is previously cold-molded into a shape similar to the final molded shape, and the preliminary molded member is placed in a mold and then molded into the final shape by applying a high molding pressure of 10 to 100 MPa. Even when a complex (molding material) which is low in elongation and fluidity is used, therefore, the compound can surely extend to every corner of the mold so as to eliminate molding unevenness, and be uniformly charged into the mold so as to increase the mold density. As a result, the conductivity can be made very excellent by reduction of the volume resistivity, and furthermore it is possible to surely obtain a uniform separator which is correct also in shape.

In the separator for a fuel cell and the method of producing a separator for a fuel cell according to the invention, particularly, it is preferable to set the molding pressure of the complex to a range of 20 to 50 MPa. The molding pressure, and the mold density and the volume resistivity have the correlation shown in FIG. 5. At a molding pressure in a range of 5 to 10 MPa which is usually used in the conventional art, both the mold density and the volume resistivity fail to reach values which are required in a separator for a fuel cell. By contrast, when the molding pressure is set to a range of 20 to 50 MPa, both the mold density and the volume resistivity are stabilized to substantially constant values. When the molding pressure is set to 20 MPa at the minimum, it is possible to obtain a separator of good conductivity.

In the method of producing a separator for a fuel cell according to the invention, a final molding temperature of the complex is preferably set to a range of 150 to 170° C. When molding is conducted in this temperature range, the moldability such as elongation and fluidity in molding of the complex in which elongation and fluidity are small because of the reduced resin content can be compensated so that a separator of a predetermined shape can be obtained.

As the thermosetting resin which is useful in the invention, phenol resin which is excellent in wettability with respect to graphite powder may be most preferably used. Alternatively, any other resin such as polycarbodiimide resin, epoxy resin, furfuryl alcohol resin, urea resin, melamine resin, unsaturated polyester resin, or alkyd resin may be used as far as the resin causes a thermosetting reaction when the resin is heated, and is stable against the operating temperature of the fuel cell and components of the supplied gasses.

As the graphite powder which is useful in the invention, powder of graphite of any kind, including natural graphite, artificial graphite, carbon black, kish graphite, and expanded graphite may be used. In consideration of conditions such as cost, the kind can be arbitrarily selected. In the case where expanded graphite is used, particularly, a layer structure is formed by expanding the volume of the graphite as a result of heating. When the molding pressure is applied, layers can twine together to be firmly bonded to one another. Therefore, expanded graphite is effective in a complex in which the ratio of a thermosetting resin is to be reduced.

Other objects and effects of the invention will be clarified in embodiments which will be described below.

PREFERRED EMBODIMENTS OF THE INVENTION

Hereinafter, embodiments of the invention will be described with reference to the accompanying drawings.

Figure 1:
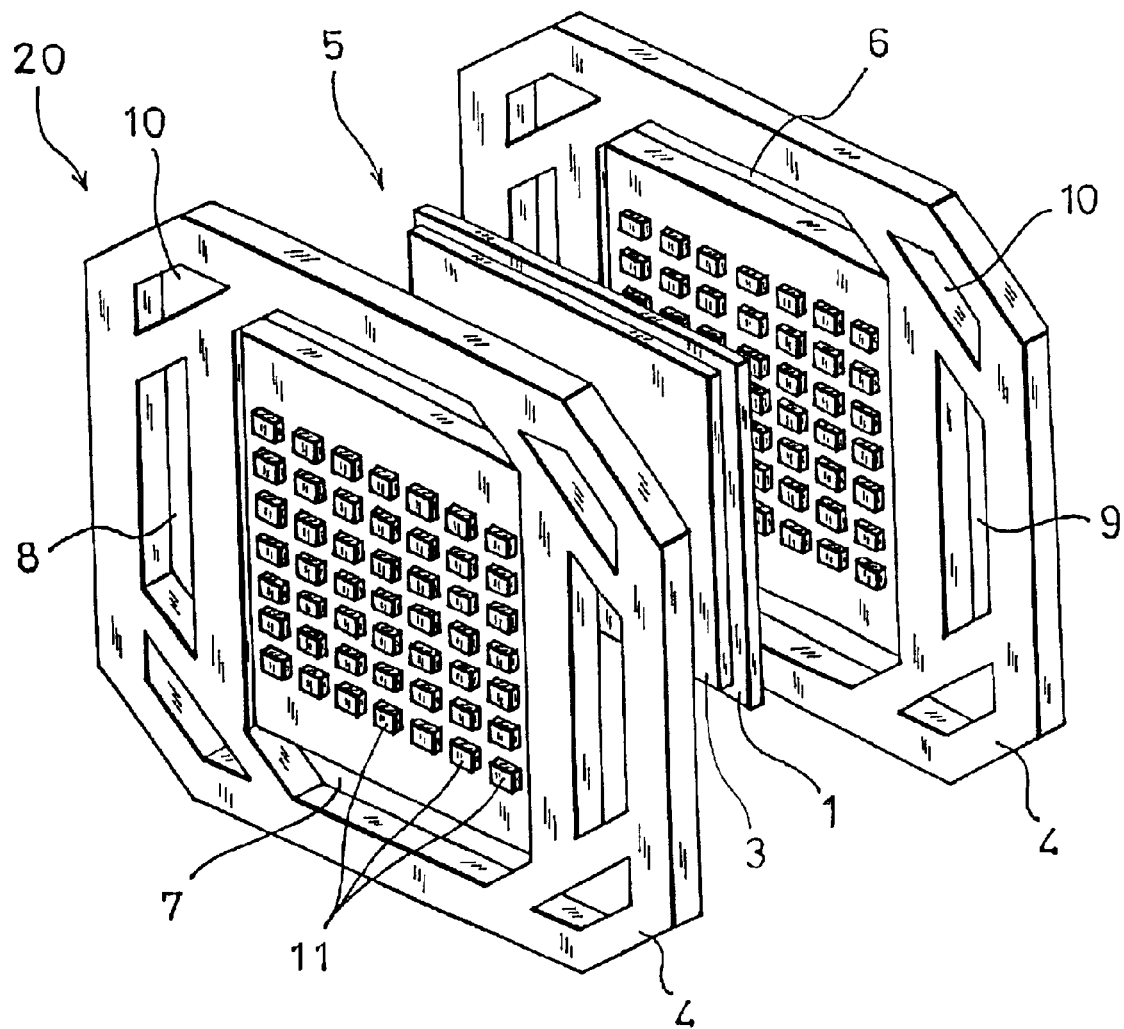
FIG. 1 is an exploded perspective view showing the configuration of a stack structure constituting a solid polymer electrolyte type fuel cell which has the separator of the invention.

First, the configuration and the operation of a solid polymer electrolyte type fuel cell having the separator of the invention will be briefly described with reference to FIGS. 1 to 3.

The solid polymer electrolyte type fuel cell 20 has a stack structure in which plural unit cells 5 are stacked and collector plates (not shown) are respectively placed on both ends. Each of the unit cells 5 is configured by: an electrolyte membrane 1 which is an ion exchange membrane made of; for example, a fluororesin; an anode 2 and a cathode 3 which are formed by carbon cloth woven of carbon filaments, carbon paper, or carbon felt, and which sandwich the electrolyte membrane 1 to constitute a gas diffusion electrode having a sandwich structure; and separators 4 which sandwich the sandwich structure.

Figure 2:
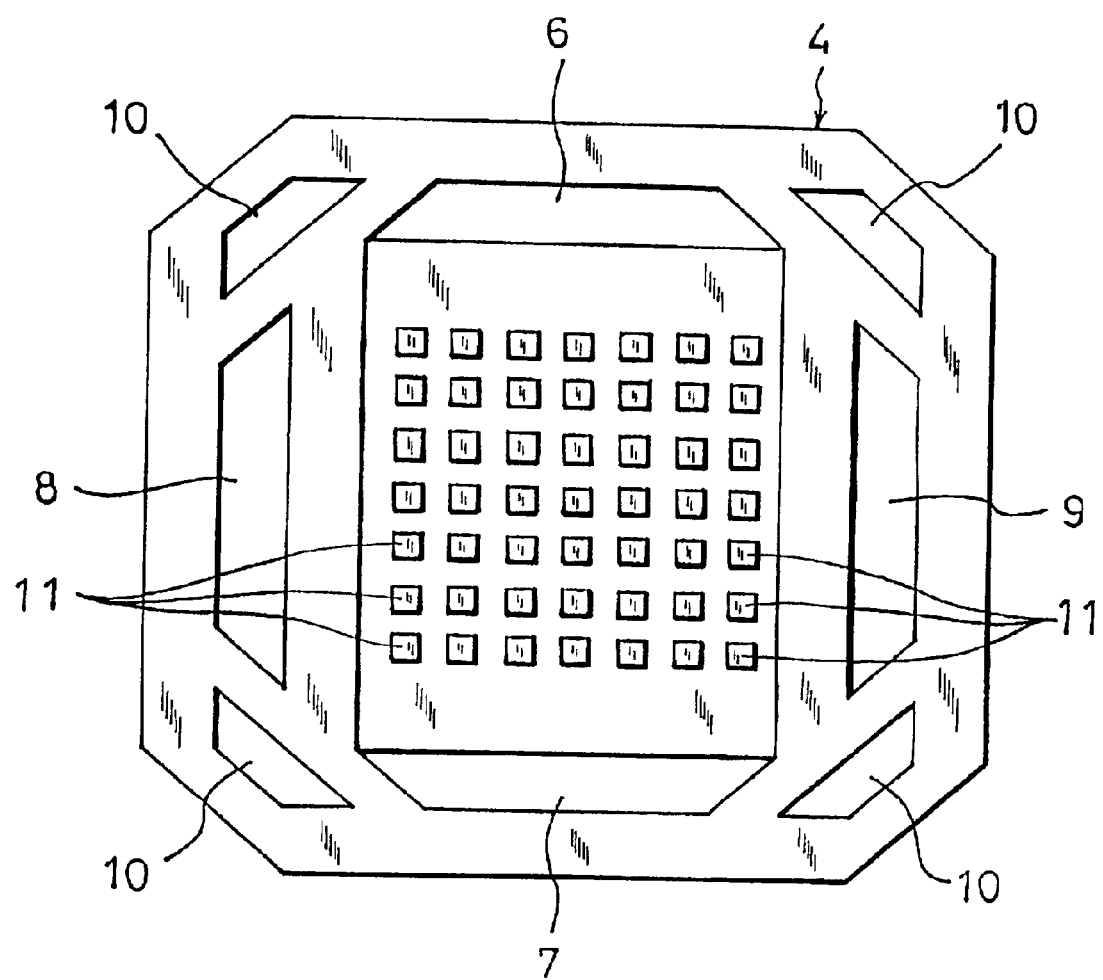
FIG. 2 is an external front view of the separator in the solid polymer electrolyte type fuel cell.

In each of the separators 4, as shown in FIG. 2, fuel gas holes 6 and 7 for a fuel gas containing hydrogen, oxidant gas holes 8 and 9 for an oxidant gas containing oxygen, and a coolant water hole 10 are formed in the peripheral area. When plural unit cells 5 are stacked, the holes 6, 7, 8, 9, and 10 of the separators 4 of the unit cells constitute holes passing through the fuel cell 20 in the longitudinal direction to form a fuel gas supply manifold, a fuel gas discharge manifold, an oxidant gas supply manifold, an oxidant gas discharge manifold, and a coolant water passage, respectively.

Figure 3:
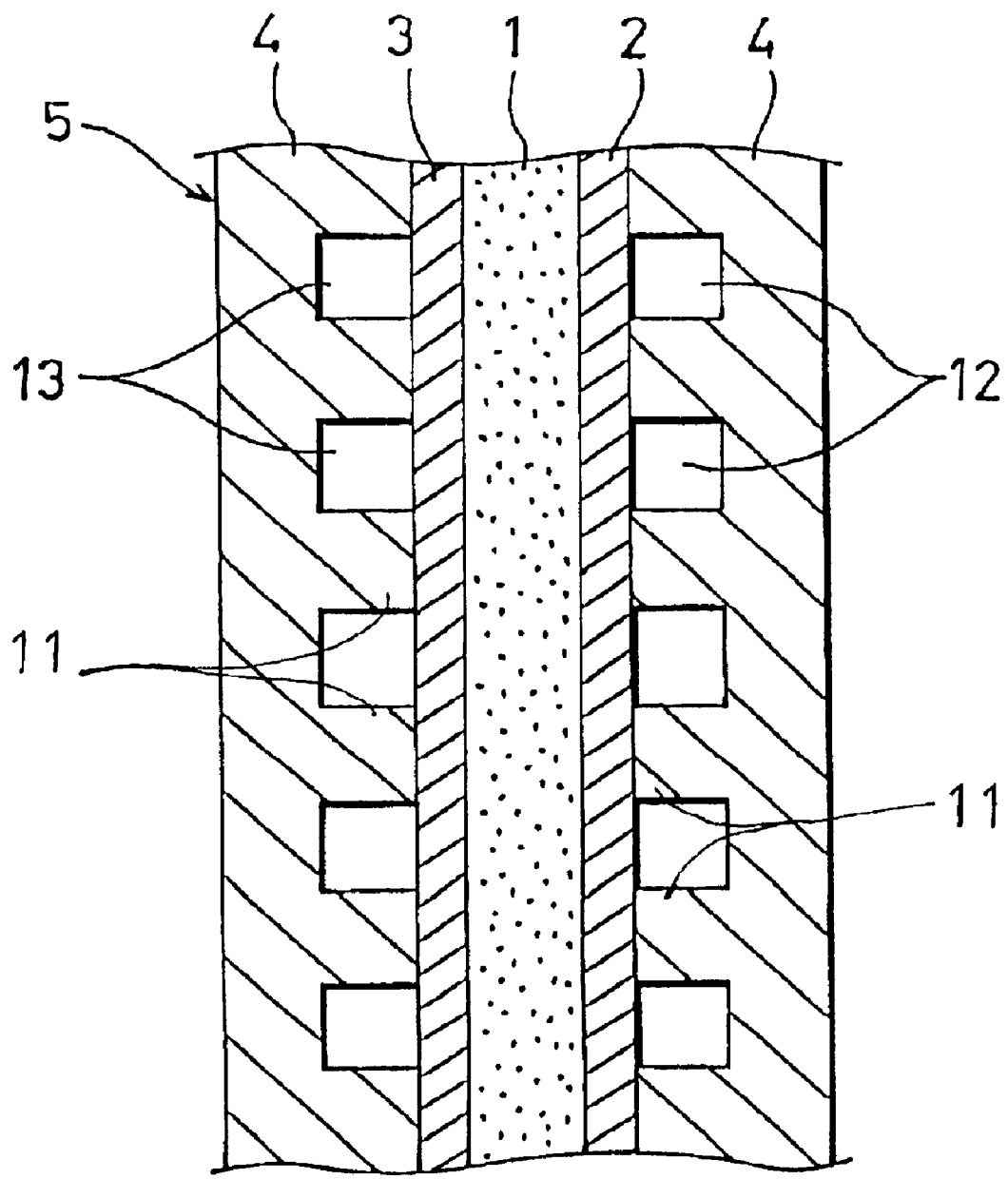
FIG. 3 is an enlarged section view of main portions and showing the configuration of a unit cell which is a unit constituting the solid polymer electrolyte type fuel cell.

As shown in FIG. 3, a large number of ribs 11 having a predetermined shape are protrudingly formed on the surfaces of the separators 4 which sandwich the electrolyte membrane 1, the anode 2, and the cathode 3. Fuel gas passages 12 are formed between the ribs 11 of one of the separators 4 and the surface of the anode 2. Oxidant gas passages 13 are formed between the ribs 11 of the other separator 4 and the surface of the cathode 3.

In the solid polymer electrolyte type fuel cell 20 configured as a stack structure in which plural unit cells 5 are stacked and the collector plates are respectively placed on both the ends, the fuel gas which is supplied from an external fuel gas supplying device to the fuel cell 20, and which contains hydrogen is then supplied into the fuel gas passages 12 of each unit cell 5 via the fuel gas supply manifold to cause the electrochemical reaction indicated by formula (1) above, on the side of the anode 2 of the unit cell 5. After the reaction, the fuel gas is discharged to the outside via the fuel gas passages 12 of the unit cell 5 and the fuel gas discharge manifold. At the same time the oxidant gas (air) which is supplied from an external oxidant gas supplying device to the fuel cell 20, and which contains oxygen is then supplied into the oxidant gas passages 13 of each unit cell 5 via the oxidant gas supply manifold to cause the electrochemical reaction indicated by formula (2) above, on the side of the cathode 3 of the unit cell 5. After the reaction, the oxidant gas is discharged to the outside via the oxidant gas passages 13 of the unit cell 5 and the oxidant gas discharge manifold.

In accordance with the electrochemical reactions of formulae (1) and (2) above, in the whole of the fuel cell 20, the electrochemical reaction indicated by the formula (3) proceeds, so that the chemical energy of the fuel is directly converted into electrical energy, with the result that the cell can exert predetermined performance. Because of the characteristics of the electrolyte membrane 1, the fuel cell 20 is operated in a temperature range of about 80 to 100° C., and hence involves heat generation. During operation of the fuel cell 20, therefore, coolant water is supplied from an external coolant water supplying device to the fuel cell 20, and the coolant water is circulated through the coolant water passage, thereby presenting the temperature of the interior of the fuel cell 20 from being raised.

Figure 4A:
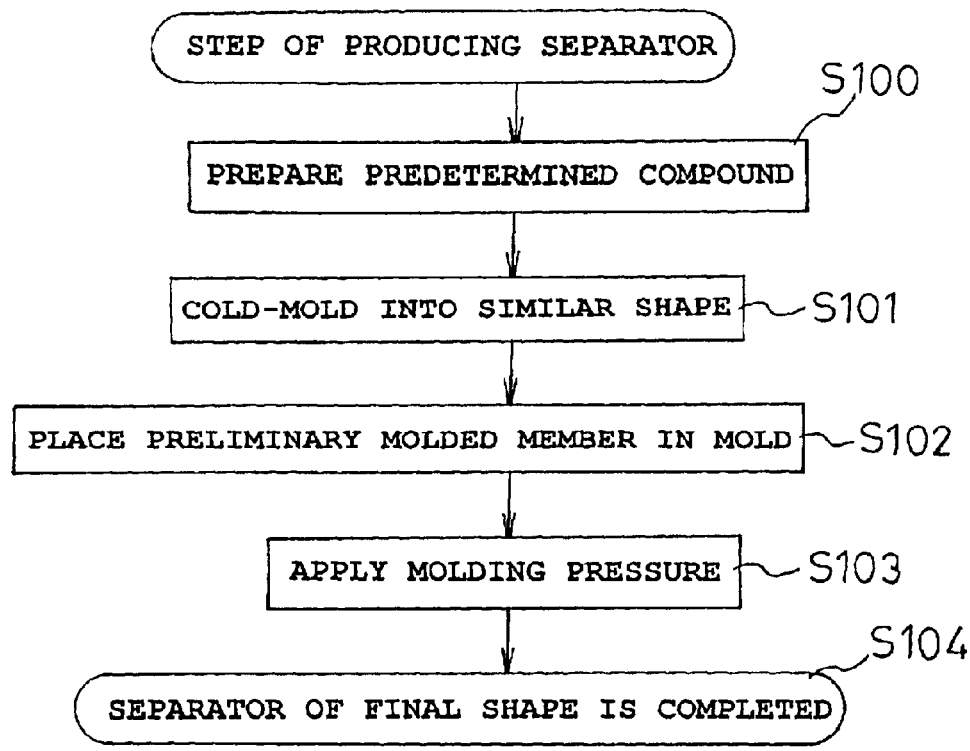
FIG. 4A is a view illustrating a step of producing the separator.
Figure 4B:
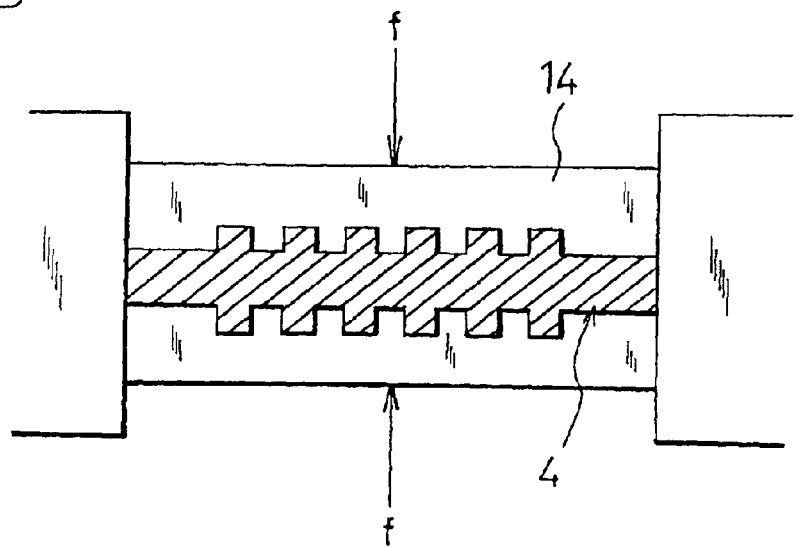
FIG. 4B is a view illustrating the manner of production.
Figure 5:
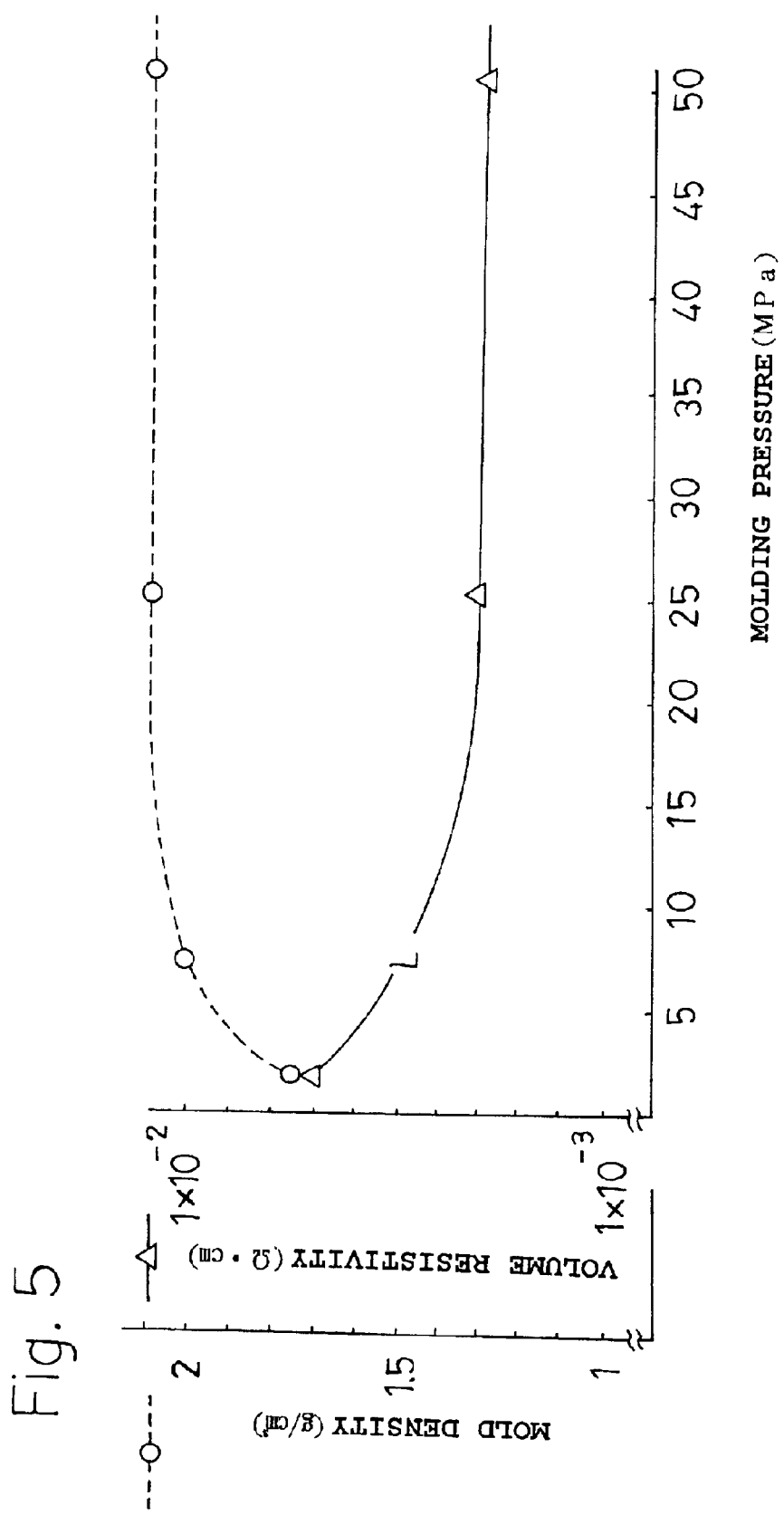
FIG. 5 is a view showing the correlation between the molding pressure, the volume resistivity and the mold density in the production of a separator according to a second embodiment.

Each of the separators 4 in the solid polymer electrolyte type fuel cell 20 which is configured and operates as described above is produced in the following manner. A method of producing the separator will be described with reference to FIGS. 4A and 4B. The separator 4 is molded by using a complex (bondcarbon) in which the composition ratios are set to 85 to 97 wt. %, preferably, 91 to 96 wt. % of graphite powder, and 3 to 15 wt. %, preferably, 4 to 9 wt. % of a thermosetting resin. The graphite powder and the thermosetting resin are uniformly mixed with each other and adjusted to produce a predetermined compound (step S100). While applying a pressure in a range of 2 to 10 MPa to the compound, the compound is previously cold-molded into a shape similar to a final molded shape (step S101). As shown in FIG. 4B, the preliminary molded member is then placed in a mold 14 having a predetermined final shape (step S102). Under this state, the mold 14 is heated to 150 to 170° C., and a pressing machine which is not shown is operated to apply a pressure in a range of 10 to 100 MPa, preferably, 20 to 50 MPa in the direction of the arrow f in FIG. 4B (step S103), thereby producing the separator 4 having the final shape which corresponds to the shape of the mold 14 (step S104).

In the separator 4 which is produced as described above, with respect to the composition ratios of the bondcarbon constituting the separator 4, the amount of the thermosetting resin is as small as 3 to 15 wt. % (preferably, 4 to 9 wt. %), and hence the bondcarbon itself has a high conductivity. After the compound of the bondcarbon is preliminary molded into a shape similar to the final molded shape, the preliminary molded member is placed in the mold 14, and a high molding pressure of 10 to 100 MPa (preferably, 20 to 50 MPa) is then applied to the member while heating the mold to 150 to 170° C. Therefore, the thermosetting resin melts and a thermosetting reaction occurs, with the result that the preliminary molded member can be uniformly molded into the separator 4 in which the mold density is high and the volume resistivity is low, and which has a predetermined shape.

As a synergistic effect of reducing the resin content, using graphite powder in which the average particle diameter is set to 15 to 125 $\mu$m, preferably, 40 to 100 $\mu$m, and raising the molding pressure, it is possible to obtain the separator 4 in which the volume resistivity is $1 \times 10^{-2}$ $\Omega \cdot$cm or lower and the conductivity is therefore higher.

Hereinafter, the invention will be described in more detail by way of embodiments.

COMPARISON EXAMPLE

A bondcarbon compound having composition ratios of 62 wt. % of artificial graphite SGS-35 (a product of SEC Co.

Ltd.) having an average particle diameter of 10 μm or less, and 38 wt. % of phenol resin was prepared. The compound was charged into a mold. A molding pressure of 10 MPa was applied to the compound for 2 minutes at a molding temperature of 160° C., thereby producing a separator of a predetermined shape.

Embodiment 1

A bondcarbon compound having composition ratios of 85 wt. % of natural graphite SN-100C (a product of SEC Co. Ltd.) having an average particle diameter in a range of 40 to 100 μm, and 15 wt. % of phenol resin was prepared. The compound was directly charged into a mold. A molding pressure of 10 to 100 MPa was applied to the compound for 2 minutes at a molding temperature of 160° C., thereby producing a separator of a predetermined shape.

Embodiment 2

A bondcarbon compound having composition ratios of 94 wt. % of natural graphite SN-100C (a product of SEC Co. Ltd.) having an average particle diameter in a range of 40 to 100 μm, and 6 wt. % of phenol resin was prepared. The compound was cold-molded by applying a molding pressure of 5 MPa, into a shape similar to a final molded shape. The tablet-like solid compound was placed in a mold. A molding pressure of 25 MPa was applied to the compound for 2 minutes at a molding temperature of 160° C., thereby producing a separator of a predetermined shape.

Embodiment 3

A bondcarbon compound having composition ratios of 94 wt. % of artificial graphite SGP-100 (a product of SEC Co. Ltd.) having an average particle diameter in a range of 40 to 100 μm, and 6 wt. % of phenol resin was prepared. The compound was cold-molded by applying a molding pressure of 10 MPa, into a shape similar to a final molded shape. The tablet-like solid compound was placed in a mold. A molding pressure of 50 MPa was applied to the compound for 2 minutes at a molding temperature of 160° C., thereby producing a separator of a predetermined shape.

The volume resistivities and bending strengths of the separators which were produced in the comparison example and Embodiments 1 to 3 were measured. The results are listed in Table 1 below.

TABLE 1

| Measurement item | Sample | | | |
|---|---|---|---|---|
| | Comparison example | Embodiment 1 | Embodiment 2 | Embodiment 3 |
| Volume resistivity (Ω · cm) | $3.5 \times 10^{-1}$ | $5.8 \times 10^{-3}$ | $2.9 \times 10^{-3}$ | $4.8 \times 10^{-3}$ |
| Bending strength (kgf/cm$^2$) | 400 | 440 | 360 | 310 |

As seen also from the results listed in Table 1 above, as compared with the separator of the comparison example which was produced by using graphite powder having an average particle diameter of 10 μm or less, increasing the resin content, and lowering the molding pressure, the separators of Embodiments 1 to 3 of the invention which were produced by using graphite powder having an average particle diameter in a range of 40 to 100 μm, reducing the resin content, and raising the molding pressure have a higher mold density while ensuring a bending strength which is equivalent to or not lower than that of the comparison example. In the separators of the embodiments, therefore, the volume resistivity can be lowered so that the conductivity can be improved.

In the case where the resin content is set to the maximum of the range, or 15 wt. %, elongation and fluidity are less reduced. As shown in Embodiment 1, therefore, the preliminary molding may be eliminated, the compound may be directly charged into a mold, and a molding pressure of 10 to 100 MPa or higher may be applied, whereby a separator which has a good conductivity as intended and is uniform can be produced with high productivity.

What is claimed is:

1. A separator for a fuel cell consisting of a complex which is configured by bonding graphite powder particles to each other by a thermosetting resin to form the separator, wherein:

a composition ratio of said graphite powder in said complex is set to 85 to 97 wt % and a composition ratio of said thermosetting resin in said complex is set to 3 to 15 wt. %;

an average particle diameter of said graphite powder is set to a range of 15 to 125 μm;

said complex is first cold-molded at a pressure of 2 to 10 MPa to form a preliminary molded member; and said preliminary molded member resultantly obtained is molded at a pressure of 20 to 50 MPa.

2. A separator for a fuel cell according to claim 1, wherein the composition ratio of said thermosetting resin in said complex is set to a range of 4 to 9 wt. %.

3. A separator for a fuel cell according to claim 2, wherein the average particle diameter of said graphite powder is set to a range of 40 to 100 μm.

4. A separator for a fuel cell according to claim 1, wherein the average particle diameter of said graphite powder is set to a range of 40 to 100 μm.

5. A method of producing a separator for a fuel cell configured by molding a complex of graphite powder and thermosetting resin, in which composition ratios of graphite powder to thermosetting resin are set to 85 to 97 wt. % of graphite powder and 3 to 15 wt. % of a thermosetting resin, and an average particle diameter of said graphite powder is set to a range of 15 to 125 μm, comprising the steps of:

cold-molding said complex into a shape similar to a final molded shape at a pressure of 2 to 10 MPa forming thereby a preliminary molded member; and placing said preliminary molded member in a mold to mold it into a final shape by applying a pressure of 20 to 50 MPa.

6. A method of producing a separator for a fuel cell according to claim 5, wherein the composition ratio of said thermosetting ratio in said complex is set to a range of 4 to 9 wt. %.

7. A method of producing a separator for a fuel cell according to claim 6, wherein the dimensions of said preliminary molded member before final molding and in a direction of the molding pressure are set to be about 1.0 to about 2.0 times the dimensions of said final molded member.

8. A method of producing a separator for a fuel cell according to claim 5, wherein the average particle diameter of said graphite powder is set to a range of 40 to 100 μm.

9. A method of producing a separator for a fuel cell according to claim 5, wherein a final molding temperature of said complex is set to a range of 150 to 170° C.

10. A method of producing a separator for a fuel cell according to claim 5, wherein the dimensions of said preliminary molded member before final molding and in a direction of the molding pressure are set to be about 1.0 to about 2.0 times the dimensions of said molded member.

* * * * *